(12) United States Patent
Kasper et al.

(10) Patent No.: US 8,669,322 B2
(45) Date of Patent: Mar. 11, 2014

(54) PROCESS FOR MANUFACTURING AN ADHESIVE BY MEANS OF EXTRUSION

(71) Applicant: Henkel AG & Co. KGAA, Duesseldorf (DE)

(72) Inventors: Dirk Kasper, Duesseldorf (DE); Knut Hoffmann, Duesseldorf (DE); Petra Padurschel, Monheim (DE); Thomas Moeller, Duesseldorf (DE); Gunter Hoffmann, Bopfingen (DE); Juergen Lotz, Kiedrich (DE); Jordi Romaguera Matas, Duesseldorf (DE)

(73) Assignee: Henkel AG & Co. KGAA, Duesseldorf (DE)

( * ) Notice: Subject to any disclaimer, the term of this patent is extended or adjusted under 35 U.S.C. 154(b) by 0 days.

(21) Appl. No.: 13/750,235

(22) Filed: Jan. 25, 2013

(65) Prior Publication Data

US 2013/0137794 A1     May 30, 2013

Related U.S. Application Data

(63) Continuation of application No. PCT/EP2011/062892, filed on Jul. 27, 2011.

(30) Foreign Application Priority Data

Jul. 27, 2010  (DE) .......................... 10 2010 038 488
Sep. 15, 2010  (EP) ...................................... 10176813

(51) Int. Cl.
   *C09J 123/12*   (2006.01)

(52) U.S. Cl.
   USPC .......................... 524/582; 524/570; 525/333.7

(58) Field of Classification Search
   USPC .......................... 524/543, 582, 570; 525/333.7
   See application file for complete search history.

(56) References Cited

U.S. PATENT DOCUMENTS

| 3,862,265 | A | * | 1/1975 | Steinkamp et al. ........... 525/285 |
| 4,359,553 | A | | 11/1982 | Edwards |
| 4,528,312 | A | | 7/1985 | Edwards |
| 5,241,014 | A | | 8/1993 | Kehr et al. |
| 5,651,927 | A | * | 7/1997 | Auda et al. ...................... 264/85 |
| 6,486,246 | B1 | | 11/2002 | Vion |
| 2009/0247706 | A1 | | 10/2009 | Krista et al. |
| 2010/0015331 | A1 | | 1/2010 | Bieser et al. |

FOREIGN PATENT DOCUMENTS

| DE | 4321529 A1 | 1/1995 |
| DE | 102007049190 A1 | 4/2009 |
| JP | 5936178 A | 2/1984 |
| JP | 10130604 A | 5/1998 |
| WO | 0146277 A2 | 6/2001 |

* cited by examiner

*Primary Examiner* — Kelechi Egwim
(74) *Attorney, Agent, or Firm* — Sun Hee Lehmann

(57) ABSTRACT

The present invention relates to a process for manufacturing an adhesive by extrusion, wherein the adhesive comprises at least one degraded polypropylene(co)polymer and at least one additional additive.

15 Claims, 2 Drawing Sheets

PROCESS FOR MANUFACTURING AN ADHESIVE BY MEANS OF EXTRUSION

BACKGROUND OF THE INVENTION

The present invention relates to a process for manufacturing an adhesive by extrusion, wherein the adhesive comprises at least one degraded polypropylene(co)polymer and at least one additional additive.

The degradation of polypropylene(co)polymers with the help of extruders is well known. By the action of shear forces at high temperature, the molecular weight of polypropylene (co)polymers can be reduced or degraded in a controlled manner due to the resulting thermomechanical stress. A further increase in efficiency of the degradation process is possible when the cited process is carried out in the presence of radical donors, such as for example peroxides.

In this context, DE 4000695 C2, for example, describes a process for manufacturing essentially amorphous poly-alpha-olefins that are manufactured from high molecular weight amorphous poly-alpha-olefins by shear stressing above the softening point in the presence of a radical donor, wherein the melt viscosity of the high molecular weight amorphous poly-alpha-olefin is at least halved. The amorphous poly-alpha-olefins manufactured in this way can be used in heavily loaded coating compounds for carpets or for hot melt adhesives.

Moreover, WO 2001/46277 A2 discloses a process for manufacturing a hot melt adhesive composition that comprises a degraded ethylene propylene copolymer, wherein a starting polymer is degraded by thermomechanical stress in the presence of a radical donor. The degraded ethylene propylene copolymer can be blended before or after its manufacture with further polymers in order to obtain polymer blends.

In conventional processes the addition of further additives to a polymer prior to carrying out the degradation process in an extruder is disadvantageous because in the course of the degradation process a difficultly controllable chemical crosslinking or interaction can occur between polymer and additive. Similarly, the later addition of further additives for manufacturing an adhesive is disadvantageous. This generally requires the already degraded extrusion product to be re-melted, which involves a high consumption of energy and a renewed thermomechanical stress of the degraded polymer, whereby its properties, such as for example its thermal stability under load and/or cohesion can worsen.

Accordingly, the object of the present invention is the provision of an improved process for manufacturing adhesives, such as for example hot melt adhesives.

The present object is achieved by the inventive process for manufacturing an adhesive by means of extrusion.

SUMMARY OF THE INVENTION

In the process according to the invention the thermomechanical degradation of a polypropylene(co)polymer occurs by shear stressing in a first extrusion section, whereas in a second extrusion section the adhesive is manufactured by adding and blending at least one additive under shear stressing, wherein the first and the second extrusion sections are linked in such a manner that the degraded polypropylene(co)polymer is transferred in the molten state from the first extrusion section into the second extrusion section.

The present invention therefore relates to a process for manufacturing an adhesive by extrusion, wherein the adhesive comprises at least one degraded polypropylene(co)polymer and at least one additional additive. The process comprises the following steps:

(a) feeding a polypropylene(co)polymer in a first extrusion section and subsequent thermomechanical degradation of the polypropylene(co)polymer in the first extrusion section by shear stress so as to manufacture a degraded polypropylene(co)polymer, wherein the temperature of the first extrusion section is above the softening point of the polypropylene(co)polymer;

(b) transferring the degraded polypropylene(co)polymer from the first extrusion section into a second extrusion section;

(c) feeding at least one additive in the second extrusion section and subsequent blending with the degraded polypropylene(co)polymer in the second extrusion section under shear stress so as to manufacture the adhesive;

wherein the melt viscosity, determined at 200° C., of the degraded polypropylene(co)polymer on entry into the second extrusion section is less than 70% of the melt viscosity, likewise determined at 200° C., of the polypropylene(co)polymer and the highest temperature in the second extrusion section is less than the highest temperature of the first extrusion section and the first and the second extrusion sections are connected in such a manner that the degraded polypropylene(co)polymer is transferred in the molten state from the first into the second extrusion section.

DETAILED DESCRIPTION OF THE INVENTION

Figure 1:
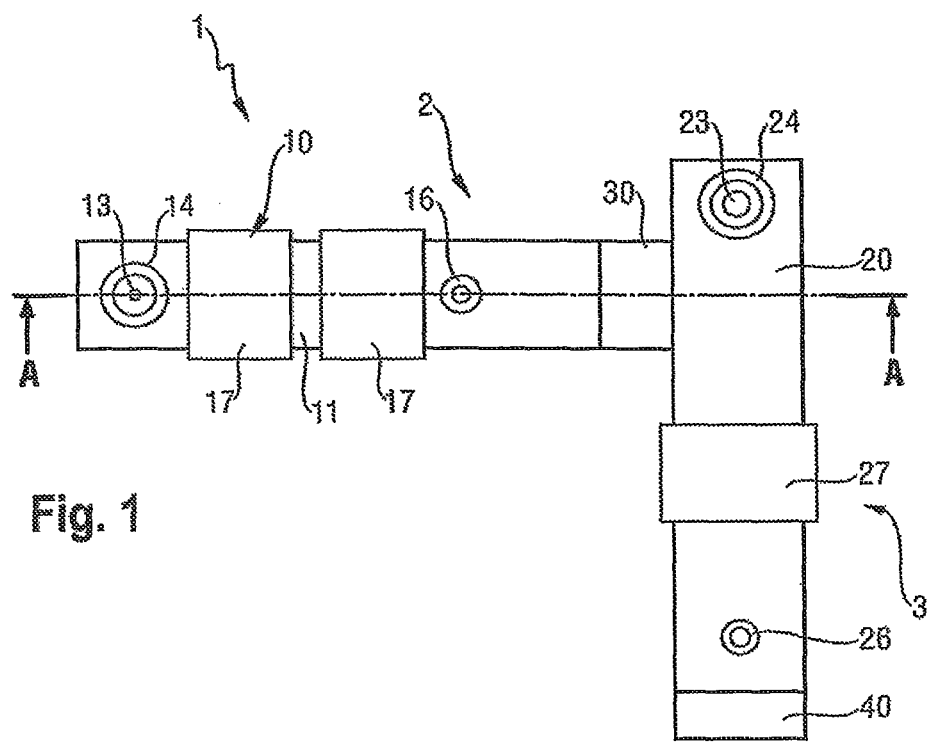
FIG. 1 is a schematic top view of an extruder set-up consisting of two extruders each comprising an extrusion section.

The process according to the invention is characterized by a high process efficiency and low energy consumption, such that from the ecological point of view it may be considered as advantageous. Furthermore, in comparison with conventionally produced adhesives, the resulting adhesives generally possess improved properties, especially in regard to thermal stability under load and/or cohesion.

In the context of the present invention, a polypropylene(co) polymer is understood to mean both polypropylene homopolymers as well as copolymers of propylene with other comonomers, such as ethylene and/or $C_4$ to $C_{20}$ alpha-olefins. In the context of the present invention, the term "polypropylene(co)polymer" also includes, in addition to a polypropylene (co)polymer, mixtures of different polypropylene(co) polymers or mixtures of polypropylene (co)polymers with other polymers.

In the context of the present invention the molten state of the degraded polypropylene (co)polymer is defined as a condition where the ratio of the viscous modulus G" to the elastic modulus G' is equal or greater than 1. The viscous modulus G" and the elastic modulus G' of the degraded polypropylene (co)polymer are measured under identical conditions. In one embodiment of the present invention the viscous modulus G" and the elastic modulus G' are each determined by using a Bohlin Gemini HR nano instrument (plate-plate geometry, temperature from 20° C. to 200° C.) from Malvern Instruments GmbH.

In a certain embodiment of the present invention the transfer of the degraded polypropylene(co)polymer in the molten state from the first extrusion section into the second extrusion section means that the degraded polypropylene(co)polymer is transferred above its softening point from the first extrusion section into the second extrusion section.

The "softening point" of the polypropylene(co)polymer and the degraded polypropylene (co)polymer is determined by the "ring and ball" method of ASTM E-28, preferably using a ring and ball machine HRB 754 from the Walter Herzog GmbH company.

In the context of the present invention, the melt viscosity of each polymer is determined at 200° C., preferably using a Brookfield Thermosell RVT Viscometer (obtainable from Brookfield Engineering Laboratories, Inc., Stoughton, Mass. USA). A spindle 27 is used for viscosities up to 100000 mPa·s, whereas a spindle 29 is used to determine melt viscosities above 100000 mPa·s. The rotational speed of the chosen spindle is preferably adjusted in a way that at 200° C. the torque readings are in the range of 10 to 95%, more preferably about 50%.

In the context of the present invention, the term "thermomechanical degradation" is understood to mean the polymer chain shortening and molecular weight reducing degradation process of the polypropylene(co)polymer which occurs in the extruder under the action of heat and shear stress.

In the context of the present invention, the "degraded polypropylene(co)polymer" is understood to mean the polymer that is manufactured from the polypropylene(co)polymer by thermomechanical degradation in an extruder. Here, the weight average molecular weight (Mw) of the degraded polypropylene(co)polymer measured under comparable conditions is always smaller than the weight average molecular weight (Mw) of the polypropylene(co)polymer.

In the context of the present invention, an "additive" is understood to mean an adhesive ingredient that is added after having carried out or at the end of the thermomechanical degradation, wherein the additive incurs essentially no chemical reaction with the degraded polypropylene(co)polymer. In the context of the present invention, the term "incurs essentially no chemical reaction" is understood to mean that during or at the end of the formulation process less than 0.5 wt %, preferably less than 0.1 wt % and especially less than 0.01 wt % of the added additive undergo a chemical reaction with the degraded polypropylene(co)polymer, for example in the form of a grafting reaction.

The term "polymer" used in connection with the description of the extruder is understood to mean both polypropylene (co)polymers as well as the corresponding degraded polypropylene (co)polymers of the present invention. Moreover, the term includes any mixtures that comprise at least one of the above mentioned polymers.

In the context of the present invention, the term "extruder" can preferably be understood to mean both single-screw as well as twin-screw extruders. The latter are technically more complex and are available in various types. One differentiates between co- and counter-rotating, intermeshing or tangential, longitudinal or transverse, open or closed and cylindrical or conical models. Compounders, expansion extruders or planetary extruders can also be used. Preferably, at least one twin-screw extruder is used for the process according to the invention.

A usable extruder can include a housing with a feed side and a discharge side, in which housing can be located at least one rotatable screw, from the screw root of which extends for example a helically running circumferential flight. The housing on the feed side can have at least one feed opening for the polymer to be processed in the extruder as well as optionally one or more feeding openings for additives, adjuvants and/or auxiliaries and can, at least near to the discharge side, have at least one degassing opening, onto which a vacuum can be applied for example, especially for suctioning off volatile components from the polymer.

The housing, especially the barrel for one or more extruder screws, can preferably be heated and/or cooled in at least some zones in order to influence the temperature of the polymer. Additionally or alternatively, it is also conceivable to equip a screw with a flow-through means for a heat exchange liquid. In this way the extruder can comprise one or more temperature zones. The extruder preferably has a plurality of different temperature zones, wherein the temperature of the same can be regulated independently of each other.

A usable extruder can also possess a plurality of extruder zones. In the context of the present invention, an "extruder zone" is understood to mean functional zones of the extruder, such as for example a feed zone, in which the polymer to be processed is fed for example through a hopper to the feed opening into the extruder and for example further conveyed by one or more extruder screws; a metering zone or compression zone, especially for melting or plasticizing the polymer, or a degradation zone or high temperature zone. Another example of an extruder zone that can be used is a mixing zone, a degassing zone or a discharge or metering zone, in which for example a polymer melt can be homogenized and brought to the desired processing temperature.

The extruder further includes at least two extrusion sections. In the context of the present invention, the term "extrusion section" is understood to mean a functional section of any development and size, which can contain a plurality of extruder zones. In the first extrusion section the polymer that is introduced through the feed opening is thermomechanically degraded. The second extrusion section begins with a feeding area where the at least one additive of the present invention is added. It is inventively conceivable that both and optionally further extrusion sections be provided inside one extruder. Alternatively however, it is also conceivable that a separate extruder be provided for each of the employed extrusion sections.

Preferably however, only one extruder is used for both extrusion sections because this construction can have a higher efficiency, for example, especially due to the reduced floor space in regard to two extruders; in addition it requires lower maintenance and needs only one drive for the extruder screw.

The temperature readings and temperature ratios used in the present invention do not refer to the temperatures or temperature ratios of the components of the extruder, the extruder zones or the extrusion sections themselves, but rather to the temperature of the polymer that is located in the corresponding components, zones or sections. The temperature of the polymer in these areas can be determined by various measurement techniques commonly used in extrusion technology and known to the person skilled in the art.

According to the invention, the first extrusion section has at least one high temperature zone that is preferably the zone where the polymer has the highest temperature of the whole process, in which the temperature is above the softening point of the polypropylene(co)polymer. This temperature can be attained either from the internal friction of the polypropylene (co)polymer in the extruder or in the respective extruder zone, or in addition or alternatively by means of the heating devices provided for this. The desired temperature is preferably mainly obtained through internal friction of the polymer by means of the explicit design of the extruder in the high temperature zone, wherein additional heating and/or cooling devices are provided on the barrel and/or on the extruder screw(s), in order to provide the possibility of fine adjustment of the temperature.

Furthermore, it is inventively intended that the temperature of the polymer in the whole of the second extrusion section be lower than the temperature of the polymer in the above mentioned high temperature zone of the first extrusion section. For the case where the second extrusion section includes a plurality of extruder zones, the temperature of all the extruder zones is lower than the temperature of the high temperature zone of the first extrusion section. The temperature in the second extrusion section can also be regulated, as described above, by internal friction of the polymer and/or by heating and/or cooling devices provided for this.

According to the invention, it is also advantageous when the ratio of the highest temperature of the first extrusion section, preferably the temperature of the high temperature zone to the highest temperature of the second extrusion section, is from 1.05 to 1.55, because in this way adhesives are obtained which exhibit a particularly good homogeneity.

The extruder that is used preferably has a feed zone, a plasticizing zone, a degradation zone and optionally a zone for increasing the temperature preferably in the first extrusion section. Here the extruder is preferably designed such that polymer temperatures between 10° C. to 40° C. can be attained in the feed zone, 10° C. to 200° C. in the plasticizing zone, 150° C. to 350° C. in the degradation zone and 200° C. to 400° C. in the optional zone for increasing the temperature, the last preferably corresponding to a temperature increase over the high temperature zone of an additional 10° C. to 50° C. The temperature is preferably achieved by a suitable design of the extruder screw, wherein heating and/or cooling devices can be optionally employed solely for fine adjustment of the temperature and temperature control of the process. A zone for increasing the temperature can also be installed.

According to the invention, the first and the second extrusion sections are connected in such a way that the degraded polypropylene(co)polymer in the first extrusion section is transferred in the molten state from the first into the second extrusion section. For the case where the extrusion sections are formed within one extruder, the temperature in the second extrusion section can also be regulated, as described above, by internal friction of the polymer and/or by heating and/or cooling devices provided for this. When an extruder is used for each extrusion section then suitable means for maintaining the polymer in its molten state are preferably used. In this case it is conceivable to use a transfer system that is heated by suitable heating devices and located between the discharge side of the first extruder and the feed side of the second extruder.

The adhesives that are manufactured in the process according to the invention particularly concern hot melt adhesives. In the context of the present invention, "hot melt adhesives" are understood to mean adhesives that are applied as a melt onto the parts to be bonded and when cooled set and solidify.

It is advantageous to manufacture hot melt adhesives by means of the process according to the invention because they can be directly obtained without carrying out an otherwise required additional formulation step that includes a renewed melting of the polymer.

In the process of the present invention one or mixtures of different polypropylene (co)polymers can be used. The polypropylene(co)polymer used in the process according to the invention is especially a polyolefin copolymer that comprises, in polymerized form, in addition to propylene at least one other comonomer that is preferably selected from ethylene and/or $C_4$ to $C_{20}$ alpha-olefins. Preferred $C_4$ to $C_{20}$ alpha-olefins include butene, pentene, hexene, heptene, octene, nonene, decene, dodecene, 4-methyl-1-pentene, 3,5,5-trimethyl-1-hexene, and 5-ethyl-1-nonene. In one embodiment of the invention, terpolymers based on propylene, ethylene and $C_4$ to $C_{20}$ alpha-olefins are used as the polypropylene(co)polymer.

For example, polymer mixtures of polypropylene(co)polymers and EPR rubbers and/or EPDM rubbers can be used in the process according to the invention.

In the context of the present invention, the term "EPR rubber" refers to elastomeric copolymers of ethylene and propylene, wherein the cited polymers are optionally modified with functional monomers and/or functional groups.

The term "EPDM rubber" refers to elastomeric terpolymers that contain propylene, ethylene and at least one diene, wherein the diene is preferably selected from 1,4-hexadiene, norbornadiene, ethylidene norbornene, dicyclopentadiene, butadiene and isoprene. The cited polymers can optionally be modified with additional functional monomers and/or functional groups.

EPR and EPDM rubbers are commercially available, for example, from Exxon Chemical Company under the trade name VISTALON® and from DMS Polymers, Inc., under the trade name KELTON®. Functionally modified EPDM rubbers that comprise anhydride groups are marketed by Exxon Chemical Company under the trade name EXXELOR®.

The described polymer mixture can be manufactured for example by mechanically blending at least one EPR/EPDM rubber with at least one polypropylene(co)polymer. Alternatively, the abovementioned polymer mixture can also be manufactured in situ in the form of a polymer alloy by stepwise polymerization in a single reactor or a series of parallel reactors. An example of such an in situ manufacture is the Catalloy process developed by Montell North America Inc. The Catalloy process can be used for example to obtain thermoplastic olefins (TPO) of the Adflex type (LyondellBasell) which represent mixtures or alloys of EPR rubbers with polypropylene(co)polymers, and in the context of the present invention can be advantageously used as starting materials in the process according to the invention.

If polymer mixtures of polypropylene(co)polymers and EPR rubbers and/or EPDM rubbers are used in the process according to the invention, then it is preferred that the content of EPR or EPDM rubbers makes up 5 wt % to 80 wt %, preferably 20 wt % to 70 wt %, each based on the total quantity of polypropylene(co)polymers and EPR rubbers and/or EPDM rubbers. In this way, after the process according to the invention has been carried out, adhesives, such as for example hot melt adhesives, can be obtained which exhibit a high cohesion and flexibility.

The propylene fraction in the polypropylene(co)polymer of the present invention is preferably between 50 and 99 wt %, especially between 60 and 95 wt % and particularly preferably between 65 and 90 wt %, each based on the total weight of the polypropylene (co)polymer. Polypropylene(co)polymers that possess the abovementioned weight fractions of propylene are particularly advantageous as in the process according to the invention the cited (co)polymers can be converted particularly effectively into the respective degradation products by means of thermomechanical degradation that affords a strong reduction in molecular weight and a decreased viscosity.

In so far as it is present, the ethylene fraction in the polypropylene(co)polymer of the present invention is preferably between 1 and 35 wt % and particularly preferably between 2 and 25 wt %, each based on the total weight of the polypropylene(co)polymer. Polypropylene(co)polymers with the abovementioned weight fractions of ethylene can likewise be effectively converted into the respective degradation products.

The weight average molecular weight (Mw) of the polypropylene(co)polymer of the present invention is preferably between 100000 g/mol and 3000000 g/mol, particularly preferably 150000 g/mol to 1000000 g/mol and quite particularly preferably 250000 to 750000 g/mol, wherein the weight average molecular weight in the context of this invention is determined by means of gel permeation chromatography (GPC) using a polystyrene standard.

The use of high molecular weight polypropylene(co)polymers with a weight average molecular weight of at least 100000 g/mol, preferably at least 150 000 g/mol and particularly at least 250000 g/mol, is advantageous as the cited (co)polymers can be cost-effectively manufactured and can be degraded efficiently to the degraded polypropylene(co)polymers of the present invention.

Due to the thermomechanical degradation carried out in the process according to the invention and the associated reduction in molecular weight, it is generally not expedient to use low molecular weight polypropylene(co)polymers with a weight average molecular weight (Mw) of less than 100000 g/mol as the starting materials.

Step a) of the process according to the invention is preferably carried out in such a way that the weight average molecular weight (Mw) of the degraded polypropylene(co)polymer on entry into the second extrusion section is less than 70%, preferably less than 50%, particularly preferably less than 30% and most preferably less than 20% of the weight average molecular weight (Mw) of the added polypropylene(co)polymer, measured under identical conditions. The weight average molecular weight (Mw) of the added polypropylene(co)polymer is understood to mean its initial molecular weight, i.e. the weight average molecular weight (Mw) of the polypropylene(co)polymer prior to carrying out the process according to the invention.

Due to the above described reduction in molecular weight, the viscosity and the processing temperature of the degraded polypropylene(co)polymer are significantly reduced, whereby in step (c) of the process according to the invention, a particularly effective blending of the degraded polypropylene(co)polymer with the at least one additive of the present invention is achieved even at low temperatures.

Moreover, in the context of the present invention it is important that the melt viscosity, measured at 200° C., of the degraded polypropylene(co)polymer on entry into the second extrusion section is less than 70%, preferably less than 50%, particularly preferably less than 30% and most preferably less than 20% of the melt viscosity of the initial polypropylene (co)polymer, likewise measured at 200° C. The use of degraded polypropylene(co)polymers, whose melt viscosity (200° C.) is more than 70% of the melt viscosity (200° C.) of the initial polypropylene(co)polymer, is disadvantageous as these polymers are generally not suitable matrix resins for adhesives, such as for example hot melt adhesives.

"Melt viscosity" of the employed polypropylene(co)polymer is understood here to mean its initial melt viscosity, i.e. the melt viscosity of the polypropylene(co)polymer determined at 200° C. prior to carrying out the process according to the invention.

The polypropylene(co)polymer preferably has a melt viscosity, measured at 200° C., of at least 300000 mPa·s. In particular, the melt viscosity of the polypropylene(co)polymer, measured at 200° C., is between 350000 mPa·s and 20000000 mPa·s, preferably between 400000 mPa·s and 10000000 mPa·s and particularly preferably between 450000 mPa·s and 5000000 mPa·s.

The melt viscosity of the degraded polypropylene(co)polymer, measured at 200° C., is preferably between 500 mPa·s and 1000000 mPa·s, particularly preferably between 1000 mPa·s and 500 000 mPa·s, extremely preferably between 2000 mPa·s and 250000 mPa·s and quite particularly preferably between 2500 mPa·s and 150 000 mPa·s.

In particular the melt viscosity of the degraded polypropylene(co)polymer, measured at 200° C., is preferably less than 1000000 mPa·s, particularly preferably less than 500000 mPa·s, extremely preferably less than 250000 mPa·s and quite particularly preferably less than 150000 mPa·s.

In a particular embodiment of the process according to the invention, the melt viscosity of the polypropylene(co)polymer is at least 300000 mPa·s and that of the degraded polypropylene(co)polymer is from 500 to 1000000 mPa·s more preferably from 1000 to 100000 mPa·s, wherein the melt viscosities are each determined at a temperature of 200° C.

The melt viscosity is measured as described previously.

The softening point of the polypropylene(co)polymer of the present invention is preferably between 90° C. and 170° C., particularly preferably 100° C. and 160° C. and most preferably between 120° C. and 150° C. The use of polypropylene(co)polymers having a softening point between 90° C. and 170° C. is advantageous in the context of the process according to the invention, as they are particularly advantageously suitable as the base polymers for hot melt adhesives.

In a separate embodiment of the present invention, the softening point of the degraded polypropylene(co)polymer of the present invention is between 120° C. and 160° C., particularly preferably 125° C. and 150° C. and most preferably between 130° C. and 145° C.

The softening point is measured as described previously.

In one embodiment of the present invention the total amount of degraded polypropylene (co)polymer in the adhesive of the present invention is from 10 to 85 wt %, more preferably from 30 to 70 wt %, and particularly preferably from 40 to 60 wt %.

In order to increase the efficiency of the thermomechanical degradation it is particularly advantageous to carry out the thermomechanical degradation in step a) of the process according to the invention in the presence of at least one radical donor and/or in the presence of oxygen.

In the context of the present invention, a "radical donor" is understood to mean a substance that under external influence, such as heat and/or radiation, decomposes into radicals.

The inventively used radical donors are primarily compounds that contain peroxo or diazo groups, wherein peroxides, such as for example organic peroxides, are preferred due to their commercial availability and ease of handling. Suitable radical sources can be selected for example from the following products or compounds and/or from any mixtures thereof. TRIGONOX 101® (2,5-dimethyl-2,5-di-[tert-butylperoxy]hexane), TRIGONOX 301® (3,6,9-triethyl-3,6,9-trimethyl-1,4,7-triperoxonane), both commercially available from AKZO, di-tert-amyl peroxide, commercially available from CK Witco as DTAP® and from AKZO as Trigonox 201®, dicumyl peroxide, di-tert-butyl peroxide, 2,5-dimethyl-2,5-di(tert-butyl peroxy)-3-hexyne, 1,3-bis(tert-butyl peroxy isopropyl)benzene, 1,1-bis(tert-butyl peroxy)-3,3,5-trimethylcyclohexane, n-butyl-4,4-bis(tert-butyl peroxy)valerate, benzoyl peroxide, p-chlorobenzoyl peroxide, 2,4-dichlorobenzoyl peroxide, tert-butyl peroxybenzoate, tert-butyl peroxy isopropyl carbonate, diacetyl peroxide, lauroyl peroxide, tert-butyl cumyl peroxide, tert-butyl peroxy 2-ethylhexanoate.

Preferred peroxides have a half-life, determined in monochlorobenzene at 150° C., of 0.01 h to 10 h, preferably 0.1 h to 5 h and particularly preferably 0.3 h to 3 h.

In the context of the process according to the invention, the radical donor is advantageously added in an amount of 0.02 to 5 wt %, preferably from 0.05 to 2 wt % and especially from 0.1 to 1 wt %, based on the total amount of polypropylene (co)polymer.

Preferably, a peroxide is added as the radical donor in an amount of 0.05 to 3 wt %, preferably from 0.1 to 2 wt % and especially from 0.2 to 1 wt %, each based on the total amount of polypropylene(co)polymer.

By using the described amount of radical donor or peroxide, the thermomechanical degradation can be carried out at a temperature of 100° C. to 350° C., preferably from 120° C. to 320° C. and particularly preferably from 140° C. to 300° C., wherein relatively short residence times of 0.1 min to 3 min can be realized in the first extrusion section.

In order to efficiently control the thermomechanical degradation, it is possible to carry out step a) of the process according to the invention under an atmosphere of inert gas, such as for example a nitrogen atmosphere.

In particular it is preferred that the degraded polypropylene (co)polymer, on entering the second extrusion section, comprises less than 0.01 wt %, preferably less than 0.005 wt % and particularly preferably less than 0.001 wt % of radical donors, each based on the total amount of degraded polypropylene(co)polymer.

The amount of radical donor in the degraded polypropylene(co)polymer on entering the second extrusion section can be influenced or controlled by the choice of a radical donor having a suitable half-life, by setting a suitable temperature in the respective extrusion zones and by a suitable residence time of the polypropylene(co)polymer in the first extrusion section.

A residual concentration of less than 0.01 wt % of radical donor in the degraded polypropylene(co)polymer on entering the second extrusion section is advantageous, as this enables adhesives, such as for example hot melt adhesives, to be obtained which are characterized by improved properties, such as for example an improved thermal stability under load and/or cohesion. Moreover, a low residual concentration of radical donor in the degraded polypropylene(co)polymer enables a particularly effective formulation of the adhesive in step c) of the process according to the invention, because no further degradation of the just degraded polypropylene(co) polymer occurs even at higher temperatures in the second extrusion section and moreover a chemical reaction between the degraded polypropylene(co)polymer and the added additive is avoided.

In one embodiment of the invention the additive is added in an amount such that the total amount of additive in the adhesive of the present invention is at least 10 wt %, preferably at least 20 wt.%, more preferably at least 30 wt %, and particularly preferably at least 40 wt %. Preferably the total amount of additive in the adhesive of the present invention is from 10 to 90 wt %, more preferably from 30 to 75 wt %, and particularly preferably from 35 to 65 wt %.

The additive that is added in step c) of the process according to the invention is preferably selected from tackifying resins, waxes, stabilizers, crosslinking agents, fillers, nucleating agents, antioxidants, adhesion promoters, oils, plasticizers, elastomers, polymers and/or from any of their mixtures, wherein the addition of tackifying resins is particularly preferred, because they can lend an additional tack to the adhesive.

"Tackifying resins" are understood to mean in particular polymeric additives for the polypropylene(co)polymers of the present invention which increase their autoadhesion (tack, inherent tack, self-adhesion).

The tackifying resin is preferably added in an amount such that the total amount of the tackifying resin in the adhesive of the present invention ranges from 10 to 85 wt %, preferably from 20 to 70 wt % and most preferably from 25 to 60 wt %.

Tackifying resins can be selected especially from the following substances and/or from any of their mixtures:
(d) naturally occurring and modified tree resins, such as for example rubber tree resins, wood resins, tall oil tree resins, distilled tree resins, hydrogenated tree resins, dimerized tree resins and polymerized tree resins;
(e) esters of glycerine and of pentaerythritol of naturally occurring and modified tree resins, such as for example the glycerine esters of pale wood tree resin, the glycerine esters of hydrogenated tree resin, the glycerine esters of polymerized tree resin, the pentaerythritol esters of pale wood tree resin, the pentaerythritol esters of hydrogenated tree resin, the pentaerythritol esters of tall oil tree resin and the phenolically modified pentaerythritol esters of tree resin;
(f) polyterpene resins with a softening point of 60° C. to 140° C., (ASTM method E28-58T), wherein polyterpene resins are generally manufactured by the polymerization of terpene hydrocarbons, such as for example pinene, in the presence of Friedel-Crafts catalysts at low temperatures;
(g) copolymers and terpolymers of naturally occurring terpenes, e.g. styrene/terpene, α-methyl styrene/terpene and vinyltoluene/terpene,
(h) phenolically modified terpene resins, such as for example acid manufactured condensation products of terpene and phenol;
(i) aliphatic, optionally hydrogenated hydrocarbons, wherein the cited aliphatic hydrocarbons are manufactured especially by the polymerization of olefins and/or diolefins.

Waxes are preferably added in an amount of 1 to 45 wt %, preferably 5 to 35 wt %, each based on the total amount of adhesive. The quantity is gauged so that, on the one hand, the viscosity is reduced to the required range and, on the other hand, the adhesion is not adversely affected. The wax can be of natural or synthetic origin and can optionally also be in chemically modified form. Naturally occurring waxes that can be added are vegetable waxes, animal waxes, mineral waxes or petrochemical waxes. Suitable chemically modified waxes are hard waxes, such as Montan ester waxes, Sasol waxes, etc. Suitable synthetic waxes are polyalkylene waxes and polyethylene glycol waxes. Petrochemical waxes are preferably added such as petrolatum, paraffin waxes, microcrystalline waxes as well as synthetic waxes.

Stabilizers are preferably added in an amount of 0.1 to 3 wt %, preferably 0.2 to 1.5 wt %, each based on the total amount of the adhesive. In general stabilizers are incorporated in order to protect the adhesive as the end product of the process according to the invention against oxidative or thermal degradation reactions that can occur in storage and/or application. The usable stabilizers preferably include hindered phenols and/or multifunctional phenols, such as for example sulfur-containing and/or phosphorus-containing phenols. Hindered phenols are understood to mean compounds, in which at least one sterically hindered group, such as for example a tert-butyl group, is bonded to the phenol, wherein the sterically hindered groups are located especially in the ortho and/or para position to the phenolic OH group.

Exemplary hindered phenols that are suitable stabilizers can be selected from the following compounds or from any of their mixtures: 1,3,5-trimethyl-2,4,6-tris(3,5-di-tert.-butyl-4-hydroxybenzyl)benzene, pentaerythritol tetrakis-(3,5-di-tert.-butyl-4-hydroxyphenyl)propionate, n-octadecyl-(3,5-di-tert.-butyl-4-hydroxyphenyl) propionate, 4,4'-methylene bis(4-methyl-6-tert.-butylphenol), 4,4'-thiobis(6-tert.-butyl-o-resol), 2,6-di-tert.-butylphenol, 6-(4-hydroxyphenoxy)-2,4-bis(n-octylthio)-1,3,5-triazine, 2,4,6-tris(4-hydroxy-3,5-di-tert.-butylphenoxy)-1,3,5-triazine, di-n-octadecyl-3,5-di-tert.-butylbenzyl phosphonate, 2-(n-octylthio)ethyl-3,5-di-tert.-butyl-4-hydroxybenzoate and sorbitol hexa-(3,3,5-di-tert.-butyl-4-hydroxyphenyl)propionate.

Further additives can be added, such as for example crosslinking agents, fillers, nucleating agents, antioxidants, adhesion promoters, oils, plasticizers, elastomers which are known to the person skilled in the art and can be selected from a great number of commercially available products as a function of the desired properties. Additional polymers of higher or lower molecular weight (Mw) than the degraded polypropylene(co)polymer can be added to modify the adhesive properties. These polymers can be any of the conventional hot melt polymers as described in: Paul C W (2002) Hot Melt Adhesives in: Chaudhury M and Pocius A V (ed) Surfaces, Chemistry and Applications: Adhesion Science and Engineering, Elsevier Science B. V., The Netherlands pp 711-757.

The adhesives, such as for example hot melt adhesives, manufactured in the process according to the invention, have a viscosity that is matched to the usual coating techniques. The viscosity of the adhesives or hot melt adhesives is from 100 mPa·s to 200000 mPa·s, preferably 500 mPa·s to 100000 mPa·s and particularly 700 mP·s to 50000 mPa·s.

In the context of the present invention, the viscosity of the adhesive can be determined at 160° C., preferably using a Brookfield Thermosell RVT Viscometer (obtainable from von Brookfield Engineering Laboratories, Inc., Stoughton, Mass. USA). A spindle 27 is used for viscosities up to 100000 mPa·s, whereas a spindle 29 is used to determine viscosities above 100000 mPa·s. The rotational speed of the chosen spindle is preferably adjusted in a way that at 160° C. the torque readings are in the range of 10 to 95%, more preferably about 50%.

In an alternative embodiment of the present invention the viscosity of the adhesive can be determined at 200° C., preferably using a Brookfield Thermosell RVT Viscometer (obtainable from von Brookfield Engineering Laboratories, Inc., Stoughton, Mass. USA). A spindle 27 is used for viscosities up to 100000 mPa·s, whereas a spindle 29 is used to determine viscosities above 100 000 mPa·s. The rotational speed of the chosen spindle is preferably adjusted in a way that at 200° C. the torque readings are in the range of 10 to 95%, more preferably about 50%.

For the application it is convenient to use an adhesive or a hot melt adhesive with the lowest possible viscosity at the application temperature. This ensures that the adhesive or hot melt adhesive can be better applied and more easily pumped. The wetting of the substrate is likewise facilitated. After application onto a substrate surface the side of the adhesive or hot melt adhesive facing towards the air has to remain as tacky and adherent as long as possible. This open time depends on the melt behavior and crystallization behavior of the adhesive or hot melt adhesive.

The adhesives or hot melt adhesives can be used for bonding substrates, such as unpainted or uncoated paper, pre-and post impregnated sheets of paper or corresponding cardboard, films, plastics or glass, as well as for other applications. Multi-ply films, packaging, wood-bonded substrates, books, filters, non-wovens, synthetic turf or carpet backing or containers such as folding boxes, outer cartons or trays can be manufactured with the help of the adhesives or hot melt adhesives manufactured in the process according to the invention.

An extruder set-up that can be used for the process according to the invention is illustrated in the accompanying drawings.

FIG. 1 showed a top view of an extruder set-up 1 consisting of two extruders 10, 20, which are connected together by means of a connection zone 30. The first extruder 10 includes a first extrusion section 2 that involves a thermomechanical degradation of the polypropylene (co)polymer introduced through a feed opening 13 on a feeding side of a housing 11 of the first extruder 10. The second extruder 20 includes the second extrusion section 3 that by the addition of at least one additive involves a formulation of the polymer to an adhesive.

In order to feed the polymer into the feed opening 13 into the first extruder 10, the extruder is equipped with a hopper 14. The housing 11 is equipped with a plurality of heating elements 17 that are arranged in the form of jackets around the housing 11 and which can influence the temperature of the polymer inside the housing 11. The heating elements 17 can equally be designed as cooling elements in order to reduce the temperature of the polymer. The temperature is moreover preferably influenced by internal friction of the polymer by means of the explicit design of the extruder screws (not shown) located in the housing 11, such that the heating elements 17 can be used solely for maintaining the temperature or for fine adjustment of the temperature of the polymer. The first extruder 10 on a discharge side furthermore has a degassing opening 16, on which a vacuum can be applied on the extruder 10, for example in order to suction off volatile components of the degraded polypropylene(co)polymer. The housing 11 can furthermore be equipped with additional elements (not shown), such as for example temperature sensors for measuring the temperature of the housing 11 or of the polymer, additional degassing openings and/or additional feed openings for feeding additional auxiliaries, additives or initiators.

A connection zone 30 is attached onto the discharge side of the first extruder 10, thereby providing a connection between the first extruder 10 and the second extruder 20 and enabling the degraded polypropylene(co)polymer to be transferred from a discharge opening on the discharge side of the extruder 10 into a side feed in a housing 21 of the second extruder 20.

The side feed is located between the feed side and the discharge side of the extruder 20, close to the feed side. A feed opening 23 equipped with a hopper 24 is also provided in the housing 21 on the feed side of the second extruder 20. Additives for the formulation in the second extrusion section 3 in the extruder 20 can be fed through the hopper.

The housing of the second extruder 20 is likewise equipped with a heating element 27 that here as well can also be designed as a cooling element. On the discharge side, the second extruder 20 has a further degassing opening 26 and can be equipped with additional degassing openings and/or additional feed openings for feeding additional additives and/or for measuring devices.

A granulation means 40 for the manufactured adhesive is provided on the discharge side of the second extruder 20 in order that the adhesive can be converted into bulk material on leaving the second extrusion section in the second extruder 20 through a discharge opening (not shown).

Figure 2:
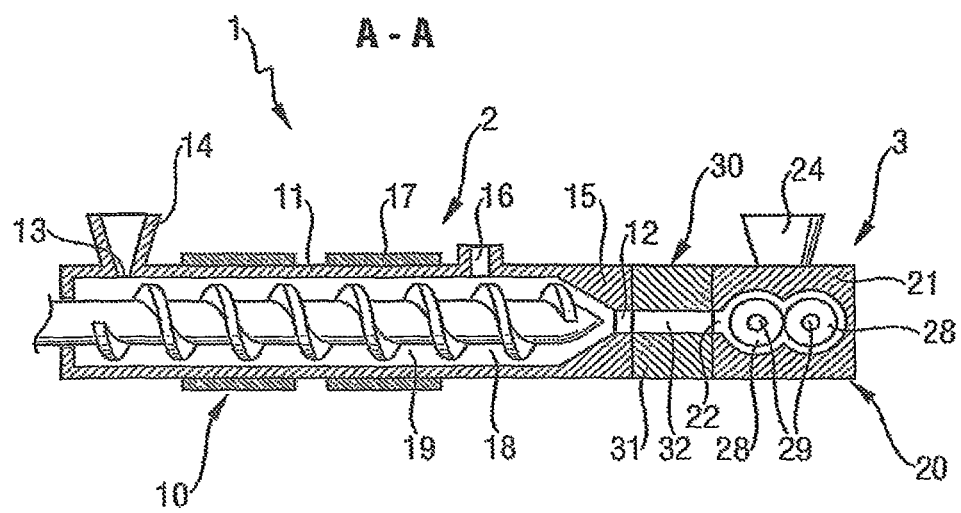
FIG. 2 is a cross sectional schematic side view of the extruder set-up of FIG. 1 through the cross sectional line A-A.

FIG. 2 shows a cross sectional side view through the cross section line A-A of the extruder set-up 1 of FIG. 1. The feed opening 13 with the hopper 14 of the housing 11 of the first extruder 10 can be seen on the feed side. The polypropylene (co)polymer is fed here into the extruder 10. The melt viscosity of the polypropylene(co)polymer being used is at least 300 000 mPa·s, the melt viscosity being measured at a temperature of 200° C.

The extruder 10 involves, as described above, a thermomechanical degradation of the polypropylene(co)polymer in the first extrusion section 2 by shear stress for manufacturing a degraded polypropylene(co)polymer, wherein the temperature of the first extrusion section 2 is at least in a range above the softening point of the polypropylene(co)polymer, and the melt viscosity, measured at 200° C., of the degraded polypropylene(co)polymer on entering into the second extrusion section 3 is less than 70% of the melt viscosity, likewise measured at 200° C., of the polypropylene(co)polymer. The required temperature of the polypropylene(co)polymer in this case is preferably attained by internal friction of itself inside the extruder 10. The two adjacently arranged extruder screws 18 provided inside the housing 11 are designed accordingly for this. The extruder screws 18 additionally possess channels 19, through which a heat transfer liquid can be pumped, in order to either heat or cool the extruder screws 18. The jacket-shaped heating elements 17 are provided on the housing 11 and run around the housing 11 in order to influence the temperature of the polypropylene(co)polymer and maintain the temperature of the process.

The illustrated extruder 10 comprises a plurality of extruder zones. These are understood to mean functional zones of the extruder 10, such as for example a feed zone, in which the polypropylene(co)polymer is fed for example through the feed opening 13 into the extruder 10 and further conveyed by the extruder screws 18; a plasticizing zone or compression zone, especially for melting or plasticizing the polypropylene(co)polymer, in which an initiator (not shown), in the present case at least one radical donor, for example a peroxide, is added. Alternatively however, it is also possible to already add the initiator in the feed zone. Furthermore, a degradation zone or high temperature zone is provided, in which the initiator is decomposed, as well as an optional zone located at the end of the first extrusion section 2 for increasing the temperature so as to further decompose the residual initiator. The high temperature zone for decomposing the initiator is designed such that the initiator fraction, in the present case the radical donor, in the degraded polypropylene(co) polymer is less than 0.01 wt % on entering the second extrusion section 3. In addition, the melt viscosity of the polypropylene(co)polymer degraded in the first extrusion section 2 in the previous embodiment is 500 to 1 000 000 mPa·s, the melt viscosity being measured at a temperature of 200° C. Naturally, even more extruder zones that are suitable can be provided.

The extruder 10 to be used is preferably designed such that polypropylene(co)polymer temperatures between 10° C. to 40° C. can be attained in the feed zone, 10° C. to 200° C. in the plasticizing zone, 150° C. to 350° C. in the degradation zone or high temperature zone and 200° C. to 400° C. in the optional zone for increasing the temperature, the last preferably corresponding to a temperature increase over the high temperature zone of an additional 10° C. to 50° C. The extruder screws 18 and the channels 19 for the heat exchange liquid are preferably designed in such a way, and separately adjustable heating elements 17 are provided for the respective zones, such that the required temperatures can be attained and maintained for the respective extruder zones.

On its discharge side, the first extruder 10 possesses the degassing opening 16 as well as a tapering 15 that opens out in a discharge opening 12 in the housing 11, from which the degraded polypropylene(co)polymer can be dispensed. The connection zone 30 is provided for transferring the degraded polypropylene(co)polymer from the first extrusion section in the first extruder 10 into the second extrusion section 3 in the second extruder 20. For this, the polypropylene(co)polymer degraded in the first extruder 10 is discharged through the discharge opening 12 of the extruder 10 and arrives in a channel 32 of the connection zone 30, which connects the discharge opening 12 of the first extruder 10 with a side feed 22 in the housing 21 of the second extruder 20.

The connection zone 30 is equipped with a heating mantel 31 that jackets the channel 32 in order to transfer the degraded polypropylene(co)polymer in its molten state from first extrusion section 2 into the second extrusion sector 3.

The heating mantel 31 contains an outer cooling jacket made of fire-aluminated-plate surrounding a heater jacket made of galvanized white plate and fire-aluminated-plate, wherein the heater jacket surrounds the channel 32 and a tubelike wall encasing the channel 32 respectively. Furthermore the heating mantel 31 comprises an insulation material, in the available case mica. With such a heating mantel 31 the temperature of the degraded polypropylene(co)polymer in the channel 32 is maintained above its softening point and the degraded polypropylene(co)polymer in the channel 32 is transferred in the molten state from the first extrusion section 2 into the second extrusion section 3, respectively. In the shown embodiment the temperature of the degraded polypropylene(co)polymer in the channel 32 is at least above 180° C. It is also possible to use a thermometer which is not shown to measure the temperature of the degraded polypropylene(co) polymer in the channel 32 to control the heater of the heating mantel 31 to maintain said temperature. It is also possible to use any other heating possibility as heating mantel 31 suitable for the shown embodiment and known to anyone skilled in the art. It is for example possible to use a heater made of fire-aluminated-plate with a clamp band made of fire-aluminated-plate with indented lip as well as a cooling jacket made of a fire-aluminated-plate and ceramic as an insulation material. As an alternative it is also possible to use heating made of stainless steel which is externally corrugated, a cooling jacket made of fire-aluminated-plate and a mineral as an insulation material. As an alternative the heating mantel 31 could be built as a heating band surrounding the channel 32 and a tubelike wall encasing the channel 32 respectively, for example a electrically driven ceramic heating band or a electrically driven circular heating band. Such heating bands are known to any person skilled in the art and are in use in the technical field of extruders for many years.

On the feed side, the second extruder 20 possesses the hidden feed opening with the hopper 24, into which can be fed at least one additional additive, in the present embodiment for example a tackifying resin, a wax, a crosslinking agent, a filler, a nucleating agent, an antioxidant, an adhesion promoter, an oil, a plasticizer, an elastomer or a polymer and/or a plurality of the above mentioned and/or any mixtures of the above mentioned, and which is blended with the degraded polypropylene(co)polymer in the second extrusion section 3 under shear stress by two extruder screws 28 in order to manufacture an adhesive. The second extrusion section 3 can also contain a plurality of extrusion zones, in particular a feed zone, a compression zone, a mixing zone, a degassing zone and a discharge zone.

The second extruder 20 possesses heating elements (not shown), which can also be designed as cooling devices, in order to influence the temperature of the polypropylene (co) polymer in the second extrusion section 3 or in the different extruder zones of the second extrusion section 3. In addition, the extruder screws 28 are provided with channels 29 for a heat exchange liquid. These auxiliaries and a suitable design of the extruder screws 28 can ensure that the highest temperature in the second extrusion section 3 or preferably that of the polymer in the second extrusion section is less than the highest temperature in the first extrusion section 2 or is less than the highest temperature of the polymer in the first extrusion section 2. In the present embodiment, the ratio of the highest temperature of the first extrusion section 2 to the highest temperature of the second extrusion section 3 is in a range of 1.05 to 1.55.

Figure 3:
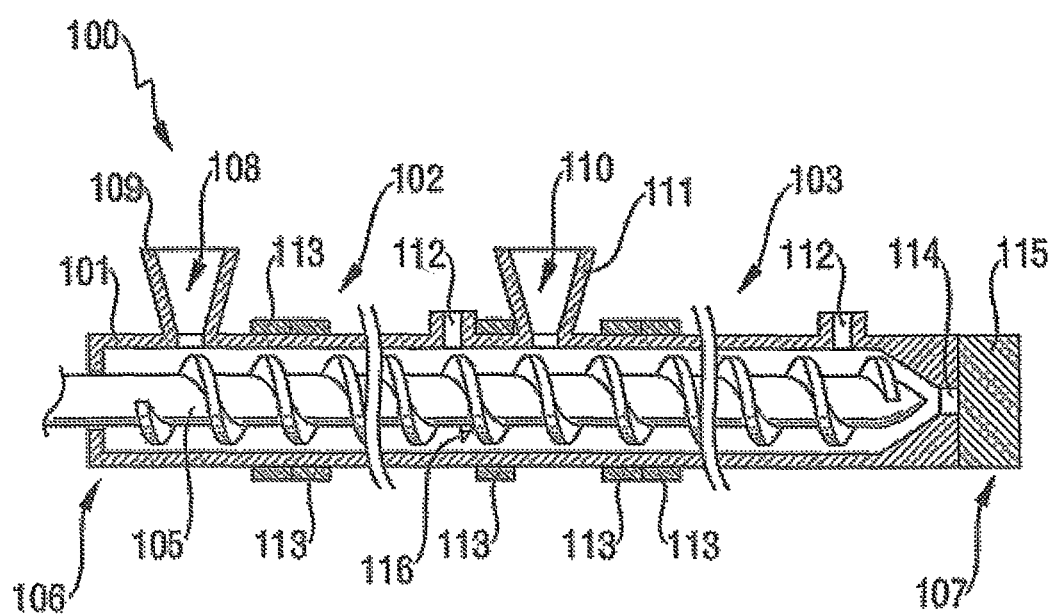
FIG. 3 is a cross sectional schematic side view of a combination extruder comprising both extrusion sections.

FIG. 3 shows a cross sectional schematic side elevation of a combination extruder 100 comprising a first extrusion section 102 and a second extrusion section 103. The illustrated extruder 100 concerns a multi-screw extruder, more precisely a twin-screw extruder, in which are provided two rotatable extruder screws 105 that extend in the longitudinal direction of a housing 101 and that are arranged parallel to one another in a cavity 104, which has a cross section in the shape of a figure eight, in the surrounding housing 101. The extruder screws 105 are mounted at a feed side 106 of the extruder 100 at one side on the housing 101 and are driven for example through a splinted shaft connection or a parallel key connection connected with a gear assembly (not shown) and by an electric motor (not shown). Any of the designs that are known to the person skilled in the art can be considered, especially a co-rotating tangential twin-screw extruder, a co-rotating intermeshing twin-screw extruder, a counter-rotating tangential twin-screw extruder or a counter-rotating intermeshing twin-screw extruder.

On the side that is opposite to the feed side 106, the housing 101 has a discharge side 107 with a discharge opening 114. Here the extrudate, in the present case a hot melt adhesive manufactured in particular from a polypropylene(co)polymer, is discharged from the extruder and transferred to an attached granulator 115, in order to transform the adhesive into an adhesive in bulk form. Further, the extruder 100 has a plurality of heating elements 113 that heat the housing 101 and the polymer located in the extruder 100 and that are preferably adjustable independently of each other. The heating elements 113 can also be equipped at the same time as cooling elements. The heating elements 113 can be equipped especially in the form of electric cartridge heaters or heating dishes. In addition, individually adjustable water circulation systems (not shown) can be used for example in particular for cooling the housing 101. In this way an overheating of the polymer, associated with a material degradation, can be avoided. These possibilities preferably serve to maintain the temperature of the process, i.e. for heating and/or cooling, but not for melting the polymer. The major part of the melting results from the energy input (shear stress) due to the rotation of the extruder screws 105.

In the area of the feed side, the extruder 100 has a first feed opening 108 with a hopper 109, in which a polypropylene(co)polymer and optional additional additives can be fed. The melt viscosity of the polypropylene(co)polymer employed in the present embodiment is at least 300000 mPa·s, the melt viscosity being measured at a temperature of 200° C. The illustrated extruder 100 comprises a plurality of extruder zones in the first extrusion section 102. These are understood to mean functional zones, such as for example a feed zone, in which the polypropylene(co)polymer is fed through the feed opening 108 into the extruder 100 and further conveyed by the extruder screws 105; a plasticizing zone or compression zone, especially for melting or plasticizing the polypropylene(co)polymer, in which an initiator (not shown), in the present case at least one radical donor, for example a peroxide, is added.

Alternatively, it is possible not to add the initiator initially in the plasticizing zone, but rather already in the feed zone or into the feed opening with the polypropylene(co)polymer. Furthermore a degradation zone or high temperature zone is provided, in which the initiator is decomposed, as well as an optional zone located at the end of the first extrusion section 102 for increasing the temperature so as to further decompose the residual initiator. The high temperature zone is understood here to mean the highest temperature zone of the process, wherein the cited temperature refers to the temperature of the polymer. The extruder 100 to be used is designed such that polypropylene(co)polymer temperatures between 10° C. to 40° C. can be attained in the feed zone, 10° C. to 200° C. in the plasticizing zone, 150° C. to 350° C. in the degradation zone or high temperature zone and a degraded polypropylene(co)polymer temperature of 200° C. to 400° C. in the optional zone for increasing the temperature, the last preferably corresponding to a temperature increase over the high temperature zone of an additional 10° C. to 50° C.

The extruder 100 and especially the extruder screws 105 are designed such that a thermomechanical degradation of the polypropylene(co)polymer occurs in the first extrusion section 102 by shear stress in order to manufacture a degraded polypropylene(co)polymer, wherein the temperature of the first extrusion section 102, preferably the temperature of the polypropylene(co)polymer, is at least in a range above the softening point of the polypropylene (co)polymer. In the present case, the degradation occurs in the presence of at least one radical donor, especially a peroxide, which is introduced into the extruder 100 through the feed opening 108 or through a feed opening (not shown). In the region at the end of the first extrusion section 102, the extruder has a degassing opening 112 in order for volatile components, especially of the radical donor by-products, to be evacuated by means of vacuum applied to the degassing opening 112. The melt viscosity of the polypropylene(co)polymer degraded in the first extrusion section 102 is 500 to 1 000 000 mPa·s, the melt viscosity being measured at a polypropylene (co)polymer temperature of 200° C.

The degraded polypropylene(co)polymer is then transferred into the second extrusion section 103 that follows the first extrusion section 102, wherein the melt viscosity of the degraded polypropylene(co)polymer, measured at 200° C., on entering the second extrusion section 103 is less than 70% of the melt viscosity of the polypropylene(co)polymer, likewise measured at 200° C. The second extrusion section 103 can also contain a plurality of extrusion zones, in particular a feed zone, a compression zone, a mixing zone, a degassing zone and a discharge zone. Furthermore, the first extrusion section 102 is designed in such a way that the content of radical donor in the degraded polypropylene(co)polymer on entry into the second extrusion section 103 is less than 0.01 wt %. This can be enabled for example by suitable dimensioning and design of the extruder screws 105 in the end zone of the first extrusion section 102 so as to increase the temperature of the degraded polypropylene(co)polymer by internal friction, thereby ensuring a decomposition of the radical donor, wherein for example, volatile components can be evacuated through the degassing opening 112 at the end zone of the first extrusion section 102.

Furthermore, the first and the second extrusion sections 102, 103 are connected by means of a transition zone 116 in such a way that the degraded polypropylene(co)polymer is transferred in its molten state from the first extrusion section 102 into the second extrusion section 103. For this, the extruder screws 105 are designed in the transition zone 116 in such a way to ensure that, due to internal friction of the degraded polypropylene(co)polymer, said polymer remains in its molten state. In addition, for maintaining the temperature, a heating element 113 is provided together with a possibility for cooling the housing 101 by, for instance, an adjustable cooling water circulation system (not shown) in the housing 101.

In the second extrusion section 103, at least one additive, for example in the present embodiment a tackifying resin, a wax, a crosslinking agent, a filler, a nucleating agent, an antioxidant, an adhesion promoter, an oil, a plasticizer or an elastomer and/or a plurality of the abovementioned and/or any mixtures of the abovementioned, is fed for example through a second feed opening 110 equipped with a hopper 111 located in the starting zone of the second extrusion section 103. Preferably the additive is fed in an amount such that the total amount of additive in the adhesive at least 20 wt %, and particularly preferably at least 40 wt %. Preferably the total amount of the additive in the adhesive of the present invention is from 30 to 75 wt %, and particularly preferably from 35 to 65 wt %.

After feeding the additive, it is blended with the degraded polypropylene (co)polymer by the extruder screws 105 under shear stress in order to manufacture the hot melt adhesive. Here, the extruder 100 and especially the extruder screws 105 in the second extrusion section 103 are designed in such a way that the highest temperature in the second extrusion section 103 or preferably that of the polymer in the second extrusion section 103 is less than the highest temperature of the first extrusion section 102 or of the polymer in the first extrusion section 102. In the present embodiment, the ratio of the highest temperature of the first extrusion section 102 to the highest temperature of the second extrusion section 103 is in a range of 1.05 to 1.55.

In the second extrusion section 103, the extruder 100 also has a plurality of heating elements 113 and possesses a cooling device (not shown). In addition, another degassing opening 112 for evacuating volatile components is provided in the end zone of the second extrusion section 103 on the discharge side 107 of the extruder 100. The cavity 104 of the extruder 100 tapers towards the discharge side 107 and opens out into the discharge opening 114. The granulator 115 is attached to the extruder 100 on the discharge side 107. Granulators 115 that can be employed for transforming the adhesive into a bulk material are specially strand pelletizers, underwater pelletizers or die-face pelletizers.

Figure elements are the following:

| | |
|---|---|
| 1 | Extruder set-up |
| 2 | First extrusion section |
| 3 | Second extrusion section |
| 10 | First extruder |
| 11 | Housing |
| 12 | Discharge opening |
| 13 | Feed opening |
| 14 | Hopper |
| 15 | Taper |
| 16 | Degassing opening |
| 17 | Heating element |
| 18 | Extruder screw |
| 19 | Channel |
| 20 | Second extruder |
| 21 | Housing |
| 22 | Side feed |
| 23 | Feed opening |
| 24 | Hopper |
| 26 | Degassing opening |
| 27 | Heating element |
| 28 | Screws |
| 29 | Channels |
| 30 | Connection zone |
| 31 | Heating jacket |
| 32 | Channel |
| 40 | Granulation means |
| 100 | Combination extruder |
| 101 | Housing |
| 102 | First extrusion section |
| 103 | Second extrusion section |
| 104 | Cavity |
| 105 | Extruder screw |
| 106 | Feed side |
| 107 | Discharge side |
| 108 | First feed opening |
| 109 | Hopper |
| 110 | Second feed opening |
| 111 | Hopper |
| 112 | Degassing openings |
| 113 | Heating elements |
| 114 | Discharge opening |
| 115 | Granulator |
| 116 | Transition zone |

EXAMPLES

The following materials were used:

Polypropylene(co)polymer alloy: Polypropylene copolymer alloy with an ethylene propylene rubber content of at least 60 wt. % from LyondellBasell (2,800,000 mPa·s (200° C.), Brookfield Thermosell RVT Viscometer, spindle 29);

Polypropylene(co)polymer blend 1: 70 wt % of the polypropylene(co)polymer alloy and 30 wt. % of an elastomeric rubber 1 (2,700,000 mPa·s (200° C.), Brookfield Thermosell RVT Viscometer, spindle 29);

Polypropylene(co)polymer blend 2: 70 wt % of a polypropylene(co)polymer (4,000,000 mPa·s (200° C.), Brookfield Thermosell RVT Viscometer, spindle 29) and 30 wt % of an elastomeric rubber 2 (450,000 mP·s (200° C.), Brookfield Thermosell RVT Viscometer, spindle 29);

Arkon P125: Hydrogenated hydrocarbon resin (tackifying resin) from Arakawa Chemicals;

Escorez 5400: Hydrogenated polycyclopentadiene resin (tackifying resin) from ExxonMobile;

Irganox 1010: Pentaerythritol tetrakis[3-(3,5-di-tert-butyl-4-hydroxyphenyl)propionate] (stabilizer) from BASF SE;

Trigonox® 301: 3,6,9-Triethyl-3,6,9,-trimethyl-1,4,7-triperoxonane, 41% solution in isoparaffinic hydrocarbons from Akzo Nobel.

Example 1

To 5000 g of polypropylene(co)polymer blend 1, 30 g TRIGONOX® 301 were added. By treating the resulting mixture in a 25 mm co-rotating twin-screw extruder (ZSK 25/40D; Werner&Pfleiderer) at 220° C. a thermomechanical degraded polypropylene(co)polymer blend 1 was obtained which exhibits a melt viscosity (200° C.) of 34,000 mP·s (Brookfield Thermosell RVT Viscometer, spindle 27).

Comparative Example 1

To a mixture of 5000 g polypropylene(co)polymer blend 1 and 2264 g Arkon P125, 30 g TRIGONOX® 301 were added. By treating the resulting mixture in a 25 mm co-rotating twin-screw extruder (ZSK 25/40D; Werner&Pfleiderer) at 220° C. a thermomechanical degraded mixture of polypropylene(co)polymer blend 1 and Arkon P125 tackifying resin was obtained. The resulting melt viscosity (200° C.) of said thermomechanical degraded mixture was 68,000 mPa·s (Brookfield Thermosell RVT Viscometer, spindle 27).

Example 1 shows that it is advantageous to add the tackifying resin after the thermomechanical degradation step has been completed because otherwise the degradation of the polymer is less effective. In Example 1 the polypropylene(co)polymer blend 1 is degraded efficiently to a low viscosity polymer having a melt viscosity of 34,000 mPa·s, while the presence of the tackifying resin Arkon P125 in comparative example 1 causes a less efficient degradation process.

Example 2

To 5000 g of polypropylene(co)polymer blend 2, 125 g TRIGONOX® 301 were added. By treating the resulting mixture in a 25 mm co-rotating twin-screw extruder (ZSK 25/40D; Werner&Pfleiderer) at 220° C. a thermomechanical degraded polypropylene(co)polymer blend 2 was obtained which exhibits a melt viscosity (200° C.) of 1614 mPa·s (Brookfield Thermosell RVT Viscometer, spindle 27).

To simulate the effect of remaining peroxide after the degradation step has been completed, different amounts of TRIGONOX® 301 (0 g @Example 2a, 0.015 g @Example 2b and 0.075 g @Example 2c) were added to 69.95 g of the thermomechanical degraded polypropylene(co)polymer blend 2 while stirring with a propeller stirrer at 200 rpm. The mixtures were stirred for additional 30 minutes at 180° C. Then 29.98 g of Escorez 5400 and 0.6 g Irganox 1010 were added at 180° C. After homogenization (about 30 minutes) the melt viscositiy (180° C.) of the resulting adhesives were measured by using a Brookfield Thermosell RVT Viscometer, spindle 27.

| Example | Melt viscosity of the adhesive after 30 min @ 180° C. | Weight percent of peroxide[1] |
|---|---|---|
| 2a | 1480 mPa · s | 0% |
| 2b | 1510 mPa · s | 0.0088% |
| 2c | 1210 mPa · s | 0.044% |

[1]based on the total amount of degraded polypropylene (co)polymer blend 2; effective concentration of 3,6,9-Triethyl-3,6,9,-trimethyl-1,4,7-triperoxonane Example 2 demonstrates that by having a residual concentration of less than 0.01 wt % of the radical donor 3,6,9-triethyl-3,6,9,-trimethyl-1,4,7-triperoxonane in the degraded polypropylene(co)polymer blend 2, adhesive formulations can be obtained which exhibit an improved thermal stability. In Example 2a and 2b the effective concentration of the radical donor is less than 0.01 wt % because only minor amounts of peroxide were added to the degraded polypropylene(co)polymer blend 2, whereas in example 2c a significant higher amount of peroxide was added. As a consequence the effective peroxide concentration in example 2c is above 0.01 wt %. The adhesive of example 2c shows an insufficient thermal stability because its melt viscosity decreases from 1480 mPa·s to 1210 mP·s when said adhesive is exposed to thermal stress.

The invention claimed is:
1. A process for manufacturing an adhesive by means of extrusion, the adhesive comprising:
   i) at least one degraded polypropylene (co)polymer and
   ii) at least one additional additive,
the process comprising the following steps:
   a) providing a first extrusion section with one or more temperature zones and a second extrusion section with one or more temperature zones;
   b) feeding a polypropylene (co)polymer into the first extrusion section and subsequently thermomechanically degrading the polypropylene (co)polymer in the presence of at least one radical donor in the first extrusion section by shear stress to manufacture a degraded polypropylene (co)polymer, wherein the temperature of the first extrusion section, at least in one zone, is above the softening point of the polypropylene (co)polymer;
   c) transferring the degraded polypropylene (co)polymer from the first extrusion section into the second extrusion section, wherein the content of the radical donor in the degraded polypropylene (co)polymer on entry into the second extrusion section is less than 0.01 wt % based on the total amount of the degraded polypropylene (co)polymer;
   d) feeding at least one additive into the second extrusion section and subsequently blending the additive with the degraded polypropylene (co)polymer under shear stress to manufacture the adhesive;
wherein
   the melt viscosity determined at 200° C. of the degraded polypropylene (co)polymer on entry into the second extrusion section is less than 70% of the melt viscosity determined at 200° C. of the polypropylene (co)polymer,
   the highest temperature in the second extrusion section is less than the highest temperature in the first extrusion section, and
   the degraded polypropylene (co)polymer is transferred in the molten state from the first extrusion section into the second extrusion section.

2. The process according to claim 1 wherein the adhesive is a hot melt adhesive.

3. The process according to claim 1 wherein the radical donor is present in an amount of from 0.02 to 5 wt.

4. The process according to claim 3 wherein the radical donor is a peroxide and is present in an amount of from 0.05 to 3 wt %.

5. The process according to claim 3 wherein the content of radical donor in the degraded polypropylene (co)polymer on entry into the second extrusion section is less than 0.01 wt %.

6. The process according to claim 1 wherein the additive is added in an amount such that the total amount of additive in the adhesive ranges from 10 to 90 wt %.

7. The process according to claim 1 wherein the additive is selected from the group consisting of tackifying resins, waxes, stabilizers, crosslinking agents, fillers, nucleating agents, antioxidants, adhesion promoters, oils, plasticizers, elastomers, polymers and any of their mixtures.

8. The process according to claim 7 wherein the additive is a tackifying resin.

9. The process according to claim 1 wherein the melt viscosity of the polypropylene (co)polymer is at least 300000 mPa·s and the melt viscosity of the degraded polypropylene (co)polymer is from 500 mPa·s to 1000000 mPa·s, wherein the melt viscosities are each determined at a temperature of 200° C.

10. The process according to claim 1 wherein the ratio of the highest temperature of the first extrusion section to the highest temperature of the second extrusion section is in a range of 1.05 to 1.55.

11. The process according to claim 1 wherein the adhesive is transformed into a bulk material after leaving the second extrusion section.

12. The process according to claim 1 wherein the melt viscosity of the adhesive is from 100 mPa·s to 200000 mPa·s and wherein the melt viscosity is determined at a temperature of 200° C.

13. A process for manufacturing a hot melt adhesive by means of extrusion comprising
   a) thermomechanically degrading a polypropylene (co)polymer by shear stress at a temperature above the softening point of the polypropylene (co)polymer to a point where the melt viscosity of the degraded (co)polymer at 200° C. is less than 70% of the melt viscosity of the initial polypropylene (co)polymer;
   b) blending in a radical donor with the degraded polypropylene (co)polymer at a temperature lower than the highest temperature in step a), under shear stress to manufacture the adhesive, and
   c) adding an additive selected from the group consisting of tackifying resins, waxes, stabilizers, crosslinking agents, fillers, nucleating agents, antioxidants, adhesion promoters, oils, plasticizers, elastomers or mixtures thereof to the degraded polypropylene (co)polymer,
   whereby the a hot melt adhesive is formed; and
   wherein the degraded polypropylene (co)polymer is in a molten state during steps a)-c).

14. The process for manufacturing a hot melt adhesive of claim 13,
   wherein the hot melt adhesive comprises 25 to 70 wt % of the degraded polypropylene (co)polymer and 30 to 75 wt % of the additive; and
   wherein the total wt % of the components equal to 100 wt % of the hot melt adhesive.

15. The process for manufacturing a hot melt adhesive of claim 14,
   wherein the hot melt adhesive comprises 35 to 65 wt % of the degraded polypropylene (co)polymer and 35 to 65 wt % of the additive.

* * * * *

UNITED STATES PATENT AND TRADEMARK OFFICE
CERTIFICATE OF CORRECTION

PATENT NO.         : 8,669,322 B2                                          Page 1 of 1
APPLICATION NO.    : 13/750235
DATED              : March 11, 2014
INVENTOR(S)        : Dirk Kasper et al.

It is certified that error appears in the above-identified patent and that said Letters Patent is hereby corrected as shown below:

On the title page, item 57, ABSTRACT, line 3: Change "polypropylene(co)polymer" to
-- polypropylene (co)polymer --.
In the specification
Column 7, line 14: Change "150 000" to -- 150000 --.
Column 8, line 7: Change "500 000" to -- 500000 --.
Column 8, line 9: Change "150 000" to -- 150000 --.
Column 11, line 31: Change "mP.s" to -- mPa.s --.
Column 11, line 49: Change "100 000" to -- 100000 --.
Column 13, line 48: Change "1 000 000" to -- 1000000 --.
Column 16, line 37: Change "1 000 000" to -- 1000000 --.
Column 18, line 37: Change "mP.s" to -- mPa.s --.
Column 18, line 57: Change "mP.s" to -- mPa.s --.
Column 19, line 56: Change "mP.s" to -- mPa.s --.
In the claims
Column 20, line 33: After "claim 1", insert -- , --.
Column 20, line 35: After "claim 1", insert -- , --.
Column 20, line 37: After "claim 3", insert -- , --.
Column 20, line 40: After "claim 3", insert -- , --.
Column 20, line 43: After "claim 1", insert -- , --.
Column 20, line 47: After "claim 1", insert -- , --.
Column 20, line 52: After "claim 7", insert -- , --.
Column 20, line 54: After "claim 1", insert -- , --.
Column 20, line 61: After "claim 1", insert -- , --.
Column 20, line 65: After "claim 1", insert -- , --.
Column 21, line 1: After "claim 1", insert -- , --.
Column 22, line 3: After "whereby", delete "the".

Signed and Sealed this
Thirty-first Day of May, 2016

Michelle K. Lee
*Director of the United States Patent and Trademark Office*